UNITED STATES PATENT OFFICE.

ERNST WALDEMAR JUNGNER, OF NORRKÖPING, SWEDEN.

REVERSIBLE GALVANIC BATTERY.

SPECIFICATION forming part of Letters Patent No. 738,110, dated September 1, 1903.

Original application filed April 17, 1899, Serial No. 713,428. Divided and this application filed June 23, 1902. Serial No. 112,932. (No model.)

*To all whom it may concern:*

Be it known that I, ERNST WALDEMAR JUNGNER, a subject of the King of Sweden and Norway, residing at Norrköping, Sweden, have invented certain new and useful Improvements in Galvanic Secondary Batteries, being a division of application Serial No. 713,428, filed April 17, 1899; and I do hereby declare the following to be a full, clear, and exact description of the invention, such as will enable others skilled in the art to which it appertains to make and use the same.

The principal faults of galvanic batteries may be said to be originally due to the changes in the chemical composition or the concentration of the electrolyte which occur at the passage of the electric current. From this follows that the constituents of the electrolyte, as well as of the active masses, are subject to changes with regard to their condition of aggregation. Such changes occur in all electrolytic cells heretofore constructed.

The present invention is intended to produce a galvanic secondary battery in which on charging or discharging the electrolyte remains throughout the same both in quality and quantity. The reason of the advantages possessed by such a source of electricity is that none of the acting materials (electrolyte or the active masses) are subject to any changes in regard to condition of aggregation. Besides, the quantity of the electrolyte, which practically does not here take part in the reaction, but rather fulfils the role of a carrier or conductor of the second order between the electrodes, may be reduced to a minimum.

If a solution of potassic hydrate is electrolyzed between two metal sheets indifferent in the same—for example, nickel—it is primarily decomposed thus:

$$KOH = K + OH.$$

In order that the electrolyte at the passage of the current shall remain unchanged, there should be present at the cathode an element capable of giving up hydroxyl (OH) under the influence of the current, such as a suitable metal hydrate, and at the anode an element capable of taking up hydroxyl under the influence of the current, such as a suitable metal in finely-divided condition. The reactions will then be:

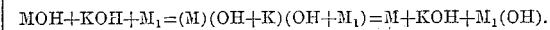

Here $M$ and $M_1$ signify metal radicals of different kinds. In order that the electrolyte shall remain unchanged, it is evidently also required that as well the metals $M$ and $M_1$ themselves as their hydrates here in question shall be substantially chemically insoluble in alkaline solution. If in the present reaction the affinity of the metal $M_1$ to hydroxyl is greater than that of the metal $M$, then it is an exotermic or discharging reaction. In case the combination is reversible there occurs then in charging an endotermic reaction.

In practice I use as active masses, for example, hydrates of iron and manganese. The electrodes are manufactured according to the indications given in my British Patents No. 15,880 of 1895 and No. 16,361 of 1897.

The positive pole-electrode is made in the following way: A mixture of hydrated peroxid of manganese and graphite moistened with water is introduced between two perforated plates of nickel, suitably sewed or connected together and subjected to pressure. They are also provided with prolongations to serve as conductors for the current. The negative pole-electrode is made in a similar manner with an active mass consisting of a mixture of ferric hydrate and graphite, the former being by cathode-electrolyte in an alkaline solution reduced to ferrous hydrate and partly to metallic iron. As inactive carrier, perforated plates of copper are used.

The different electrodes are placed alternately against each other in a suitable vessel of glass or ebonite and separated from each other by a porous or perforated insulating material. The similar electrodes are joined and connected to terminals. On discharge of this cell the following reactions take place:

(1.) 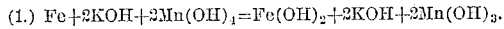

(2.) 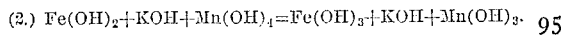

The reaction 1 (which of course takes place only if the charging has been carried far enough to produce metallic iron) gives a voltage of 0.8 volt, and the reaction 2 a voltage of 0.6 volt. On charging, the reactions are reversed.

It is obvious that the electrolyte is not subjected to any changes at all during the passage of the electric current, which only produces a simple transfer of hydroxyl from the one electrode to the other.

The electrodes, as described above, possess in a high degree mechanical strength and durability for charges and discharges.

Having described my invention, I claim—

1. In a reversible galvanic cell, an alkaline electrolyte and electrodes therein having active masses of metallic oxygen compounds, said active masses insoluble in the electrolyte under all conditions of working, substantially as set forth.

2. In a reversible galvanic cell, an alkaline electrolyte, an electrode having an active mass of an oxygen compound of a metal, and a second electrode having an active mass of an oxygen compound of another metal, both active masses substantially insoluble in the electrolyte under all conditions of working, substantially as set forth.

3. In a reversible galvanic cell, an alkaline electrolyte, an electrode having an active mass of a hydrate of a metal, and a second electrode having an active mass of a hydrate of another metal, substantially as set forth.

4. In a reversible galvanic cell, a suitable electrolyte, an electrode having an active mass of a hydrate of a metal, and a second electrode having an active mass of a hydrate of another metal, said electrodes and active masses substantially insoluble in the electrolyte, substantially as set forth.

5. In a reversible galvanic cell, an alkaline electrolyte, an electrode having an active mass of a hydrate of a metal, and a second electrode having an active mass of a hydrate of another metal, both active masses substantially insoluble in the electrolyte under all conditions of working, substantially as set forth.

6. In a reversible galvanic cell, a suitable electrolyte, an electrode having an active mass $M(OH)_n$ and another electrode having an active mass $M_1(OH)_m$, said electrodes and active masses substantially insoluble in the electrolyte, whereby, on discharging, the first active mass will be converted into $M(OH)_{n-x}$ and the second active mass into $M_1(OH)_{m+x}$ for the purpose set forth.

7. In a reversible galvanic cell, an alkaline electrolyte, an electrode having an active mass $M(OH)_n$ and another electrode having an active mass $M_1(OH)_m$, said electrodes and active masses substantially insoluble in the electrolyte, whereby, on discharging, the first active mass will be converted into $M(OH)_{n-x}$ and the second active mass into $M_1(OH)_{m+x}$, for the purpose set forth.

8. In a reversible galvanic cell, an electrode having an active mass of an oxygen compound of iron, a second electrode having an active mass of an oxygen compound of another metal, and a suitable electrolyte in which the electrodes and active masses are substantially insoluble, for the purposes set forth.

9. In a reversible galvanic cell, an electrode having an active mass of an oxygen compound of iron, a second electrode having an active mass of an oxygen compound of another metal, and an alkaline electrolyte in which the electrodes and active masses are substantially insoluble, for the purpose set forth.

10. In a reversible galvanic cell, an electrode having an active mass of an oxygen compound of iron, a second electrode having an active mass of an oxygen compound of manganese, and a suitable electrolyte in which said electrodes and active masses are substantially insoluble, for the purpose set forth.

11. In a reversible galvanic cell, an electrode having an active mass of an oxygen compound of iron, a second electrode having an active mass of an oxygen compound of manganese, and an alkaline electrolyte in which said electrodes and active masses are substantially insoluble, for the purpose set forth.

12. In a reversible galvanic cell, an electrode having an active mass of a hydrate of iron, a second electrode having an active mass of an oxygen compound of another metal, and an alkaline electrolyte, said oxygen compound substantially insoluble in the electrolyte, substantially as set forth.

13. In a reversible galvanic cell, an electrode having an active mass of a hydrate of iron, a second electrode having an active mass of a hydrate of manganese and a suitable electrolyte, substantially as set forth.

14. In a reversible galvanic cell, an electrode having an active mass of a hydrate of iron, a second electrode having an active mass of a hydrate of manganese and an alkaline electrolyte, substantially as set forth.

15. In a reversible galvanic cell, an electrode having an active mass of $Fe(OH)_2$, a second electrode having an active mass of $Mn(OH)_4$ and an alkaline electrolyte, substantially as set forth.

16. In a reversible galvanic cell, a suitable electrolyte, an electrode having an active mass $M(OH)_n$ and another electrode having an active mass $M_1(OH)_m$, said electrodes and active masses substantially insoluble in the electrolyte, whereby on discharging, the first active mass is converted into $M(OH)_{n-1}$ and the second active mass into $M_1(OH)_{m+1}$, for the purpose set forth.

17. In a reversible galvanic cell, an alkaline electrolyte, an electrode having an active mass $M(OH)_n$ and another electrode having an active mass $M_1(OH)_m$, said electrodes and active masses substantially insoluble in the electrolyte, whereby on discharging, the first active mass is converted into $M(OH)_{n-1}$ and the second active mass into $M_1(OH)_{m+1}$, for the purpose set forth.

18. In a reversible galvanic battery, a suitable electrolyte, and electrodes therein having active masses of metallic hydrates, for the purpose set forth.

19. In a reversible galvanic battery, a suitable electrolyte, an electrode therein having an active mass of the hydrate of a metal and a second electrode having an active mass of the hydrate of another metal, for the purpose set forth.

20. In a reversible galvanic battery, a suitable electrolyte, and electrodes therein having active masses of metallic hydrates, said active masses insoluble in the electrolyte, for the purpose set forth.

In testimony that I claim the foregoing as my invention I have signed my name in presence of two subscribing witnesses.

ERNST WALDEMAR JUNGNER.

Witnesses:
C. C. CRICSON,
T. BOIJI.